US006264218B1

(12) United States Patent
Slagerman

(10) Patent No.: US 6,264,218 B1
(45) Date of Patent: Jul. 24, 2001

(54) ADJUSTABLE WHEELCHAIR FRAME

(75) Inventor: Murray G. Slagerman, Lafayette, CO (US)

(73) Assignee: Sunrise Medical HHG Inc., Longmont, CO (US)

(*) Notice: Subject to any disclaimer, the term of this patent is extended or adjusted under 35 U.S.C. 154(b) by 0 days.

(21) Appl. No.: 09/332,819

(22) Filed: Jun. 14, 1999

(51) Int. Cl.$^{7}$ ........ B62B 1/00

(52) U.S. Cl. ........ 280/43; 280/647; 280/250.1

(58) Field of Search ........ 280/43, 250.1, 280/304.1, 42, 647, 650, 657, 47.4, 47.41

(56) References Cited

U.S. PATENT DOCUMENTS

| | | | | |
|---|---|---|---|---|
| 4,360,213 | | 11/1982 | Rudwick et al. . | |
| 4,730,842 | * | 3/1988 | Summers et al. | 280/638 |
| 4,852,899 | * | 8/1989 | Kueschall | 280/250.1 |
| 4,989,890 | * | 2/1991 | Lockard et al. | 280/42 |
| 5,020,816 | * | 6/1991 | Mulholland | 280/250.1 |
| 5,409,247 | * | 4/1995 | Robertson et al. | 280/250.1 |
| 5,590,893 | * | 1/1997 | Robinson et al. | 280/250.1 |
| 5,997,021 | * | 12/1999 | Robinson et al. | 280/250.1 |

FOREIGN PATENT DOCUMENTS 2 347 655 9/2000 (GB) .

* cited by examiner

*Primary Examiner*—Brian L. Johnson
*Assistant Examiner*—Tony Winner
(74) *Attorney, Agent, or Firm*—MacMillan, Sobanski & Todd, LLC

(57) ABSTRACT

A wheelchair side frame comprises a front side frame and a rear side frame coupled to the front side frame. The front side frame is adjustable relative to the rear side frame to vary the elevation of the rear side frame relative to the front side frame. The front and rear side frames may each have upper and lower portions. A first coupling couples the upper portion of the rear side frames to the upper portion of the front side frames. A second coupling couples the lower portion of the rear side frames to the lower portion of the front side frames. The first and second couplings are adjustable in elevation. A wheelchair may comprise a pair of side frames each including a front side frame and a rear side frame coupled to the front side frame. The rear side frames are adjustable in elevation relative to the front side frames. A pair of rear wheels supports the rear side frames and a pair of front casters supports the front side frames.

17 Claims, 5 Drawing Sheets

ADJUSTABLE WHEELCHAIR FRAME

BACKGROUND OF THE INVENTION

This invention relates in general to wheelchairs. More particularly, this invention relates to wheelchair frames. Most particularly, the invention relates to adjustable wheelchair frames.

Wheelchairs are well known forms of transportation that increase the mobility of the physically impaired. Wheelchairs are typically relatively small, single-person conveyances that generally comprise a seat supported by a frame which, in turn, is supported by two oppositely disposed drive wheels and two front casters.

The wheelchair occupant's center of gravity is generally positioned near the axle position of the drive wheels to permit the wheelchair occupant to maneuver the wheelchair with greater ease. The wheelchair occupant's center of gravity may be shifted in a number of ways. The drive wheels may be cambered so that the distance between the drive wheels at ground level is greater than the distance between the drive wheels at the seat. In addition to cambering the drive wheels, adjusting the position of the drive wheels relative to the wheelchair frame may also shift the wheelchair occupant's center of gravity. For example, the drive wheels may be moved forward or backward, or may be raised or lowered, relative to the wheelchair frame to shift the wheelchair occupant's center of gravity.

Adjusting the wheelchair seat relative to the wheelchair frame may also shift the center of gravity of the wheelchair occupant. In addition to shifting the center of gravity of the wheelchair occupant, adjusting the wheelchair seat may improve the orientation of the arms and hands of the wheelchair occupant relative to the drive wheels. Improving the orientation of the arms and hands of the wheelchair occupant relative to the drive wheels enables the occupant of the wheelchair to propel the wheelchair with greater comfort and increased efficiency. Optimal positioning of the wheelchair seat also reduces the risk of tissue trauma suffered by the wheelchair occupant by reducing the constant pressure between the wheelchair occupant's skin and the wheelchair, and particularly, the wheelchair seat.

A need exists for a simplified assembly for adjusting the angle of inclination of wheelchair seat in accordance with the physical characteristics of the wheelchair occupant and further in accordance with various purposes for which the wheelchair is used.

SUMMARY OF THE INVENTION

The invention relates to a wheelchair side frame comprising a front side frame and a rear side frame coupled to the front side frame. The front side frame is adjustable relative to the rear side frame to vary the elevation of the rear side frame relative to the front side frame. The invention also relates to a wheelchair side frame comprising front and rear side frames each having upper and lower portions. A first coupling couples the upper portion of the rear side frames to the upper portion of the front side frames. A second coupling couples the lower portion of the rear side frames to the lower portion of the front side frames. The first and second couplings are adjustable in elevation. The invention further relates to a wheelchair that comprises a pair of side frames each including a front side frame and a rear side frame coupled to the front side frame. The rear side frames are adjustable in elevation relative to the front side frames. A pair of rear wheels supports the rear side frames and a pair of front casters supports the front side frames.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
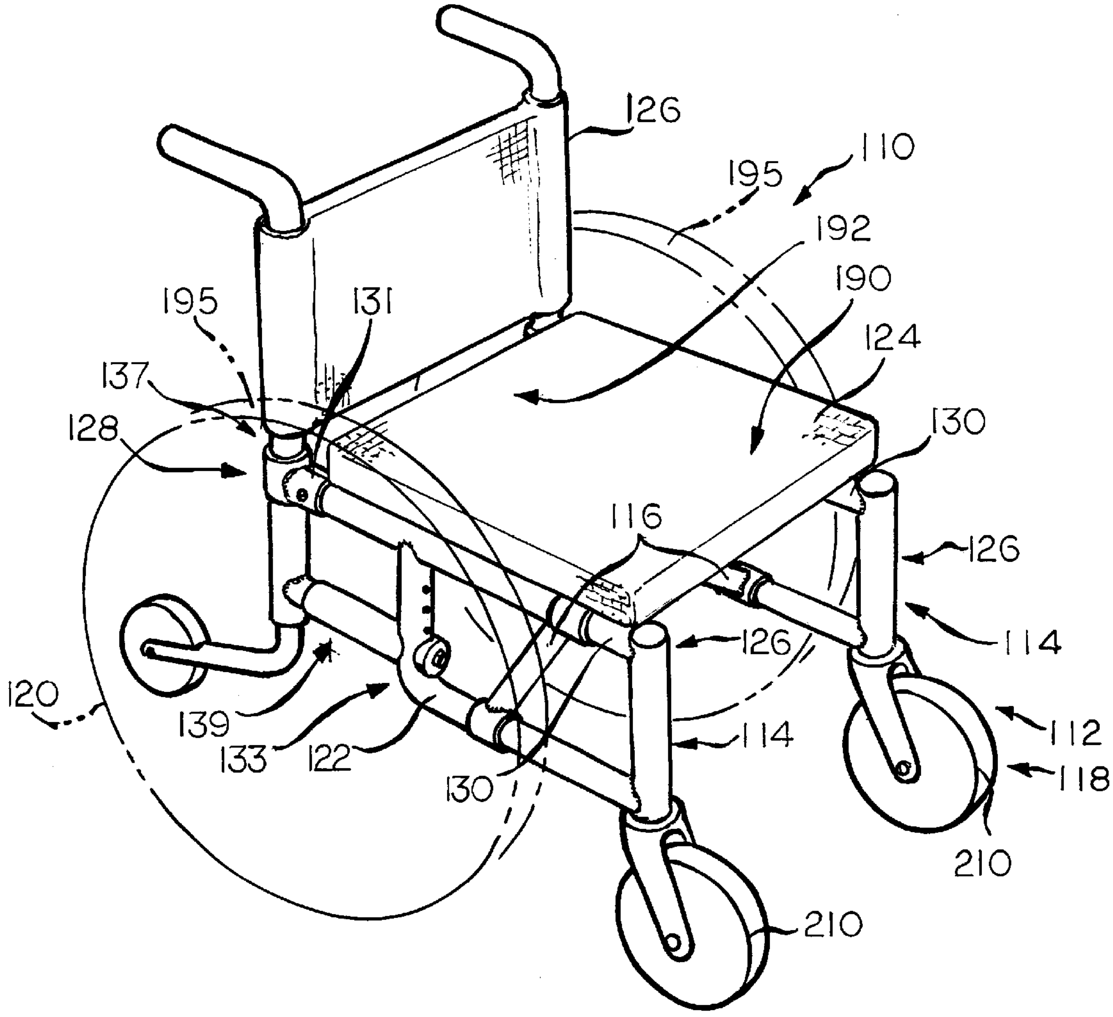
FIG. 1 is a front perspective view of a manually operated wheelchair comprising an adjustable frame according to the invention.

Referring now to the drawings, there is illustrated in FIG. 1 a wheelchair 110 having a frame 112 comprising spaced-apart side frames 114 joined together by struts or folding cross-members 116. A pair of opposing front caster assemblies 118 and a pair of opposing rear drive wheel assemblies 120 vertically support the side frames 114 relative to a supporting surface. A wheelchair seat or seat 124 is supported by, and spans between, the side frames 114 so as to permit a wheelchair occupant (not shown) to be supported generally between the side frames 114.

Each one of the side frames 114 comprises a front side frame 126 and a rear side frame 128. The front side frame 126 and the rear side frame 128 are independent relative to one another. As will become more apparent in the description that follows, the rear side frame 128 is movably coupled to, or engageable with, the front side frame 126 so as to be adjustable, or displaceable, relative to the front side frame 126 to vary the elevation of the rear side frame 128 relative to the front side frame 126. The variation in the elevation of the rear side frame 128 permits the inclination of the wheelchair seat 124 to be varied.

Figure 2:
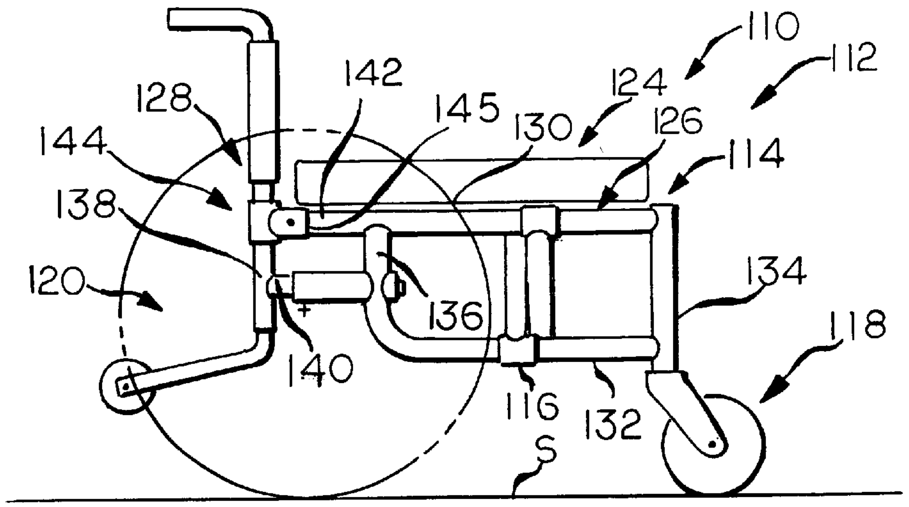
FIG. 2 is a side elevational view of the wheelchair shown in FIG. 1.

As shown in FIG. 2, each front side frame 126 includes an upper member 130 and a lower member 132. The upper member 130 is substantially parallel to the lower member 132. The upper and lower members 130 and 132 shown are substantially horizontal and spaced vertically apart. Each front side frame 126 further includes a front member 134 and a rear member 136. The front member 134 extends downwardly from a front portion of the upper member 130 to a front portion of the lower member 132 to join the upper member 130 to the lower member 132. The rear member 136 joins a rear portion of the upper member 130 to a rear portion of the lower member 132. The upper and lower members 130 and 132 are fixed relative to the front and rear members 134 and 136, such as by welding the corresponding members together. It should be understood that the members may be joined together in any suitable manner.

The upper and lower members 130 and 132 shown are substantially horizontal, and the front and rear members 134 and 136 are substantially vertical. Hence, the upper and lower members 130 and 132 are vertically spaced apart and substantially parallel to one another. Moreover, the front and rear members 134 and 136 are horizontally spaced apart and substantially parallel to one another. In this arrangement, the front and rear members 134 and 136 are substantially perpendicular relative to the upper and lower members 130 and 132. This perpendicularly arrangement of elements produces a strong, cost-effective frame suitable for supporting the weight of the wheelchair occupant, even in less than ideal operating conditions, such as when traversing rough terrain and overcoming obstacles. It should be understood that other frame configurations are suitable for carrying out the invention. For example, the side frames 114 may include curved structural elements, such as the curved tubular portion 122 (shown in FIG. 1) adjoining the rear and lower members 136 and 132 of the side frame member 114 shown.

Each rear side frame 128 is substantially L-shaped in construction. The rear side frame 128 preferably includes a substantially vertical, or rear, member 138 and a substantially horizontal, or front, member 140 extending forwardly from the vertical member 138. The horizontal member 140 shown intersects the vertical member 138 at a right angle. The vertical member 138 is also fixed relative to the horizontal member 140, such as by welding the two members 138 and 140 together. It should be understood that the two members 138 and 140 may be affixed together in any suitable manner.

Figure 3:
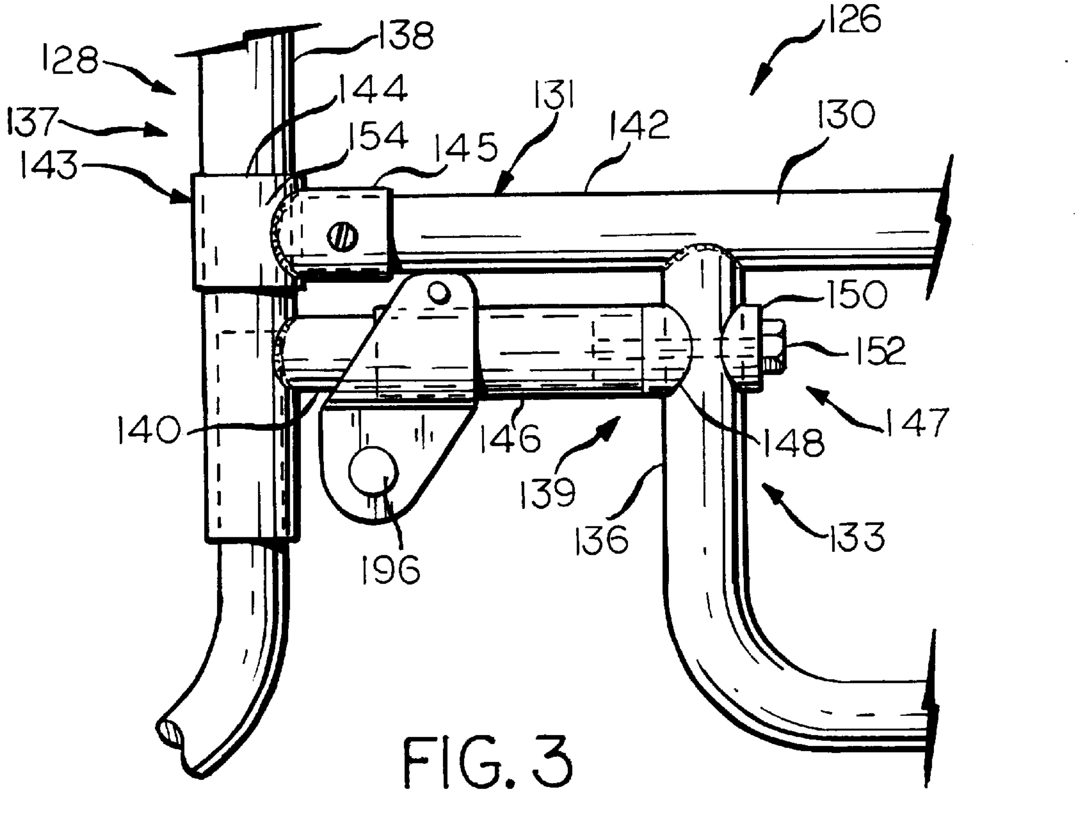
FIG. 3 is an enlarged partial side elevational view of the wheelchair shown in FIGS. 1 and 2.

As shown in the drawings, each side frame 126 and 128 further has a rear extension 142 extending rearward relative to the upper member 130 and the rear member 136 of the front side frame 126. The rear extension 142 may be an extension of the upper member 130 of the front side frame 126. The rear extension 142 is coupled to the vertical member 138 of the rear side frame 128. That is to say, upon coupling the front and rear side frames 126 and 128, the vertical member 138 of the rear side frame 128 is coupled to, or engages, the rear extension 142 of the front side frame 126. Moreover, the horizontal member 140 of the rear side frame 128 is coupled to, or engages, the rear member 136 of the front side frame 126. This engagement may be accomplished directly or indirectly, such as by an element interposed between the front and rear side frames 126 and 128. For example, the front and rear side frames 126 and 128 shown are indirectly coupled or engaged together by a first coupling 143 and a second coupling 147, as shown in FIG. 3. An upper portion 137 of the rear side frame 128 is coupled to an upper portion 131 of the front side frame 126 by the first coupling 143. A lower portion 139 of the rear side frame 128 is coupled to a lower portion 133 of the front side frame 126 by the second coupling 147.

Figure 4:
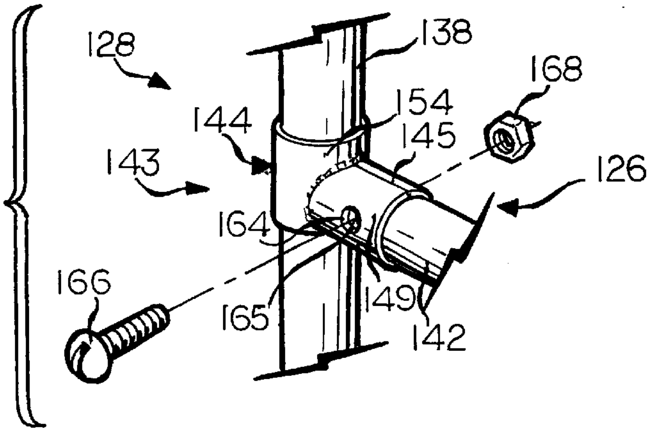
FIG. 4 is an enlarged environmental perspective view of a coupling for coupling the front and rear side frames of the invention shown in FIGS. 1 through 3.
Figure 5:
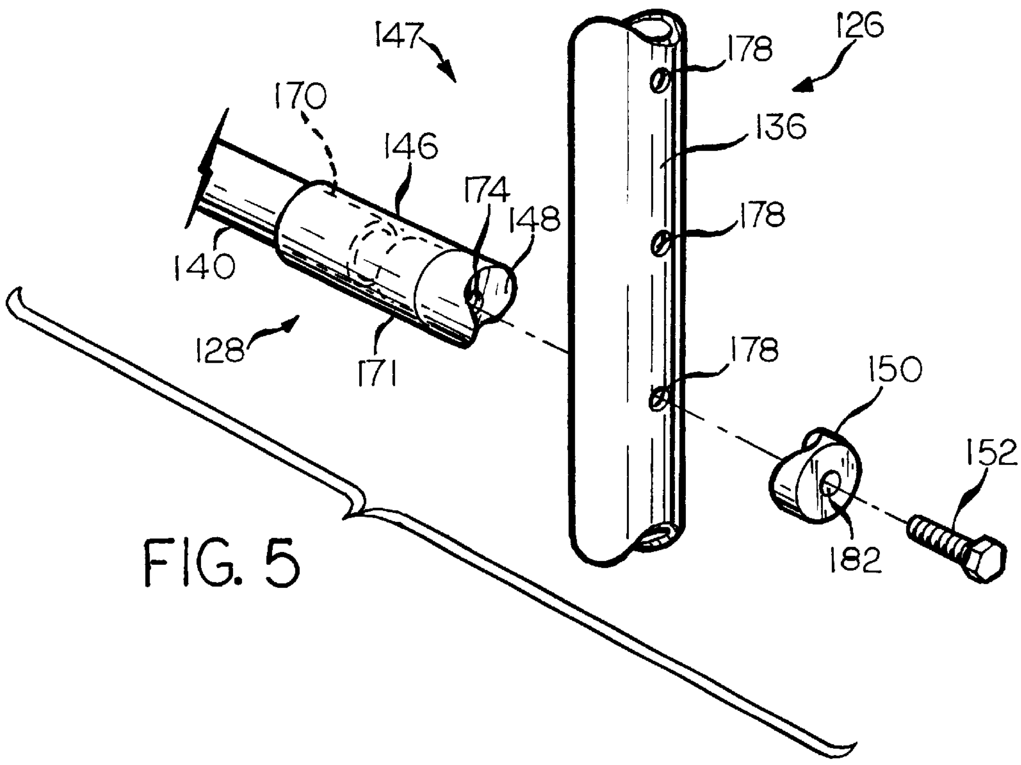
FIG. 5 is an enlarged environmental perspective view of another coupling for coupling the front and rear side frames.

The first coupling 143 comprises a pair of tube clamps 144 and 145, as shown in FIG. 4. The second coupling 147 comprises a combination of elements including a threaded sleeve 146 having a saddle surface 148, and a saddle washer 150 and a bolt 152, as shown in FIGS. 3 and 5. These coupling arrangements will be described in greater detail in the description that follows. It should be understood that the coupling arrangements shown are for illustrative purposes, and that other coupling arrangements may be suitable for carrying out the invention. It should be noted, however, that the rear extension 142 and rear member 136 of the front side frames 126 are adjustable in elevation, or in a substantially vertical direction, relative to the vertical and horizontal members 138 and 140 of the rear side frames 128, respectively.

It is preferable that each of the front and rear side frames 126 and 128 be fabricated from a substantially strong, yet light weight material, such as aluminum, or some other strong, lightweight material. It is also preferable that each of the front and rear side frames 126 and 128 be constructed from a tubular material. A tubular material is preferred because tubes are lightweight, and hence, easier to handle and transport. Among other reasons, tubes are preferred because tubes consume less material, and therefore, are less costly to produce, than solid materials.

Now continuing with reference to FIGS. 2 and 4, the engagement of the front and rear side frames 126 and 128 is accomplished with a first, or upper or rear, coupling configuration or coupling 143 comprising first and second clamps, such as the tube clamps 144 and 145 shown. A first tube clamp 144 is engageable with the vertical member 138 of the rear side frame 128. The first tube clamp 144 shown includes a ring or collar 154 that is dimensioned and configured to loosely fit about the tubular vertical member 138 of the rear side frame 128. As shown more clearly in FIG. 4, a front portion of the first coupling 143 is provided with the second tube clamp 145 extending forwardly relative to, and substantially perpendicular from, the first tube clamp 144 and includes a broken ring or collar 149. A rear portion of the rear extension 142 of the upper member 130 of the front side frame 126 is insertable into the broken ring 149. The broken ring 149 and the rear portion of the rear extension 142 are provided with co-aligning, or coaxial, holes 164 and 165. A bolt 166 is insertable into and through the holes 164 and 165 and a nut 168 is engageable with the bolt 166. Upon tightening the nut 168, the first clamp 144 secures tightly to the vertical member 138 of the rear side frame 128 while the second clamp 145 is tightly secured to the rear extension 142. This coupling configuration 143 permits the vertical member 138 of the rear side frame 128 to be coupled to, or engage, the rear extension 142 of the front side frame 126 at various point along the vertical member 138 of the rear side frame 128. Although tube clamps are shown, other configurations may be employed which permit the elevation of the rear portion of the front side frame 126 to be varied relative to the vertical member 138 of the rear side frame 128.

The invention shown further includes a second, or lower or front, coupling configuration, or coupling 147. The coupling 147 shown in FIG. 5 comprises a threaded sleeve 146 having a saddle surface 148, a saddle washer 150, and a bolt 152, as stated above. A bore 170 is provided in the sleeve 146. The bore 170 is preferably dimensioned within a close tolerance of the tube forming the horizontal member 140 of the rear side frame 128. That is to say, the bore 170 is dimensioned to receive the tube forming the horizontal member 140 of the rear side frame 128 and is fixed so that the orientation of the sleeve 146 remains generally fixed relative to the horizontal member 140. The sleeve 146 may be fixed relative to the horizontal member 140 by bonding, welding, or pinning the sleeve 146 to the horizontal member 140, or by any other suitable manner.

A forward portion of the sleeve 146 is provided with a solid member or end piece 171. An axial bore 174 is provided in the end piece 171. The axial bore 174 is threaded with a female, or internal, thread to receive a male threaded counterpart, such as the bolt 152 shown. The end piece 171 also has a front saddle surface 148. The axial bore 174 is in communication with the saddle surface 148. The saddle surface 148 is dimensioned to receive the rear member 136 of the front side frame 126, which as stated above is preferably tubular in shape. That is to say, the saddle surface 148 has a shape complementary to the shape of the rear member 136 of the front side frame 126.

A plurality of substantially vertically spaced-apart holes 178 are provided in the rear member 136. The holes 178 extend substantially longitudinally through the rear member 136 of each front side frame 126. The longitudinal direction is understood to extend between the front and rear extremities of the front side frame 126. It is preferable that the holes 178 also extend substantially parallel relative to one another. It is most preferable that the holes 178 be horizontally disposed. The holes 178 are provided to co-align with the bore 174 in the end piece 171 of the sleeve 146. It is to be understood that, if the rear member 136 is formed in the shape of a tube, which is inherently hollow, each hole 178 through the rear member 136 is comprised of co-aligning or axial apertures in opposing surfaces of the tube.

A saddle washer 150 is provided to engage a surface of the rear member 136 of the front side frame 126 opposite the surface engaged by the saddle surface 148 of the end piece 171 of the sleeve 146. That is to say, the rear member 128 of the front side frame 126 is positionable between the saddle surface 148 and the saddle washer 150. A bore 182 passes through the saddle washer 150. The saddle washer 150 is positionable along the rear member 136 of the front side frame 126. The saddle washer 150 is positionable so as to align the bore 182 in the saddle washer 150 with a corresponding hole 178 through the rear member 136 of the front side frame 126, and further with the bore 174 in the end piece 171 of the sleeve 146. The end piece 171 engages the opposing surface of the rear member 136 of the front side frame 126. The second coupling configuration or coupling 147 is formed between the end piece 171 and the saddle washer 150. The second coupling 147 forms a clamp by inserting the bolt 152 into and through the bore 182 in the saddle washer 150 and a corresponding hole 178 through the rear member 136 of the front side frame 126. The bolt 152 is further tightly threaded into the threaded bore 174 in the end piece 171 of the sleeve 146. In other words, a clamp is formed between the saddle surface 146 and the saddle washer 150 and the clamp is tightened by threadably engaging the bolt 152 relative to the horizontal member 140 of the rear side frame 128. Alternatively, the threaded bore 174 may be in the horizontal member 140 and the horizontal member 140 may be provided with a saddle surface 148, and the end piece 171 may be omitted. In any event, the threaded bore 174 and the saddle surface 148 are preferably integrated or integral with the horizontal member 140. The terms "integrated" or "integral" in this context may be interpreted, for example, to mean that the elements are fixed relative to one another.

Figure 6:
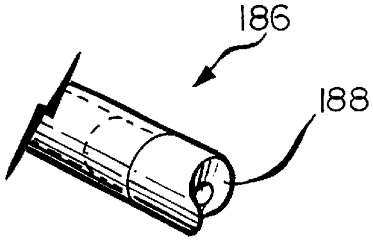
FIG. 6 is an enlarged partial perspective view of an alternative embodiment of the coupling shown in Fig. 5.

The above described front and rear side frames 126 and 128 and couplings 143 and 147 are shown for illustrative purposes. The front and rear side frames 126 and 128 may differ from those shown and described and other coupling configurations may be employed. For example, as shown in FIG. 6, a plug 186 having a saddle surface 188 may be substituted for the sleeve 146 and the end piece 171.

In operation, the front and rear side frames 126 and 128 are engageable with one another by the couplings 143 and 147 to form a rigid side frame, generally indicated at 114. As stated above, two spaced-apart side frames 114 are joined together by struts 116 to form a wheelchair frame 112. The side frames 114 support a seat 124. In particular, a front portion of the front side fame 126 supports a front portion 190 of the seat cushion 124, and a rear portion of the front side frame 126 supports a rear portion 192 of the seat cushion 124, as illustrated in FIG. 1. Each rear side frame 128 is supported on a supporting surface, such as the ground, by a rear drive wheel 195. Each front side frame 126 is supported on the supporting surface by a front caster 210. The drive wheel 195 may be coupled to the rear side frame 128 and the front caster 210 may be coupled to the front side frame 126 in any suitable manner.

Figure 7:
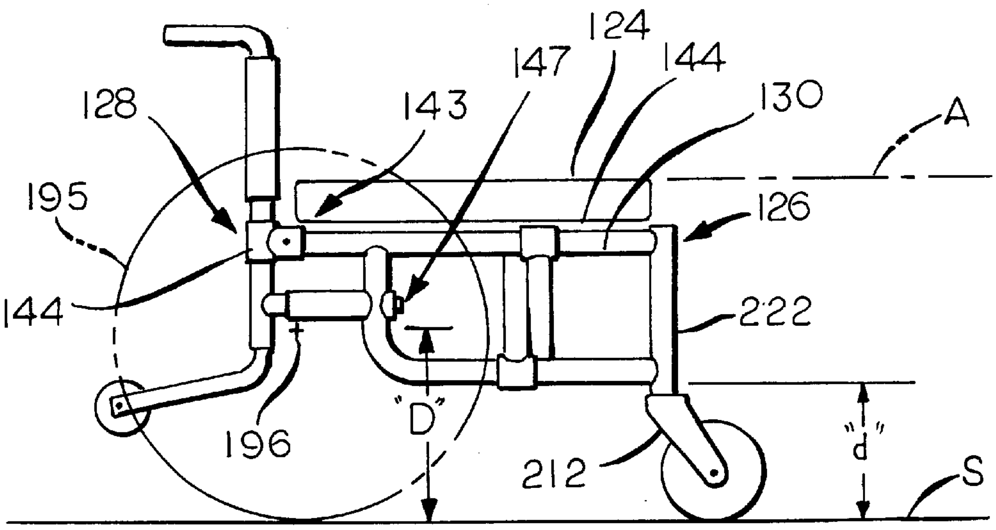
FIG. 7 is a diagrammatic representation of the wheelchair shown in FIGS. 1 through 3 with the rear side frame adjusted to elevate the wheelchair seat at an angle of inclination of about zero degrees.

As shown in FIG. 7, the rear side frames 128 remain at a substantially constant elevation relative the supporting surface because of the fixed orientation of the rear wheels 195 relative to the rear side frames 128. The elevation of the rear side frames 128 is dependent of the distance "D" between the rear wheel axles 196 and the supporting surface. The elevation of the rear wheel axles 196 is fixed relative to the rear side frames 128, and the radius of each rear wheel 195 is constant. Similarly, a front portion of each front side frame 126 remains at a substantially constant elevation relative the supporting surface because of the fixed orientation of the caster 210 relative to the front portion of the front side frame 126. The elevation of the front portion of the front side frame 126 is dependent of the distance "d" between the caster housing 222 and the supporting surface. The castors 210 are pivotally fixed relative to the front portion of the front side frames 126, and the dimensions of the castors 210 and castor forks 212 are constant.

The elevation of the rear portion of the front side frame 126 can be varied by varying the location of the first coupling 143 (that is, by varying the location of the tube clamp 144) relative to the rear side frame 128, and by varying the location of the second coupling 147 relative to a rear portion of the front side frame 126. Since the seat cushion 124 is supported by the upper member 130 of the front side frame 126, a variation in elevation of the rear extension 142, and hence, the portion of the upper member 130, relative to the elevation of the front portion of the upper member 130 results in a variation in the inclination of the seat cushion 124. As noted in the drawings, the tube clamp 144 is coupled to the rear side frame 128 in a first position and the end piece 171 of the sleeve 146 is coupled to the front side frame 126 at a first position. Note the angle of inclination (indicated at "A") of the seat 124 in FIG. 7 is about zero. That is to say, the seat 124 is substantially level in this configuration.

Figure 8:
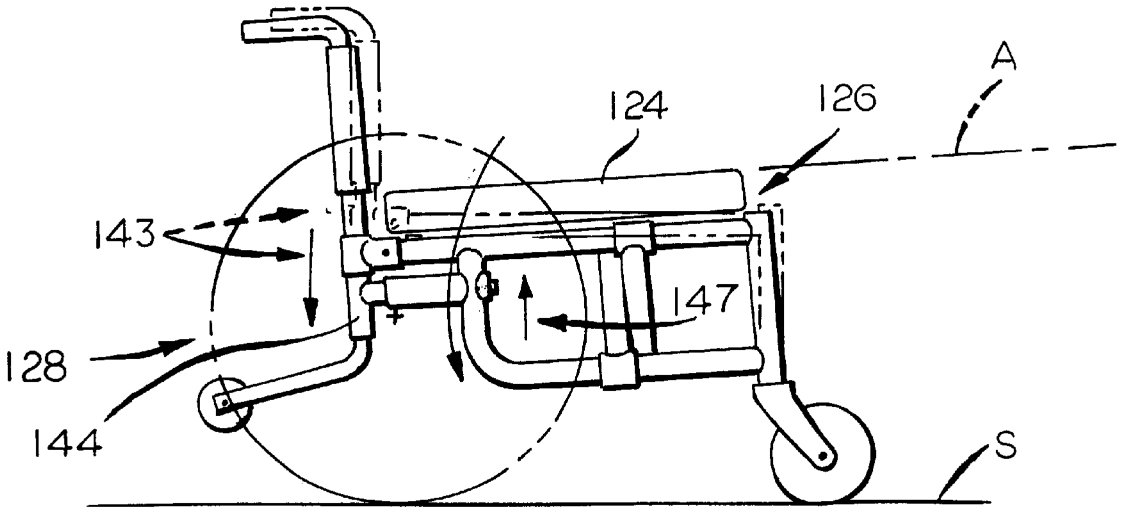
FIG. 8 is a diagrammatic representation of the wheelchair shown in FIGS. 1 through 3 with the rear side frame adjusted to elevate the wheelchair seat at an angle of inclination of greater than zero degrees.

As illustrated in FIG. 8, as the tube clamp 144 of the first coupling 143 is lowered to a second or lower position and the second coupling 147 is coupled to the front side frame 126 at a second or higher position, the angle of inclination changes. Here, the resultant angle of inclination of the seat 124 is some angle greater than zero. Note that the holes 178 in the rear member 136 of the front side frame 126 (clearly shown in FIG. 5) may be spaced apart to permit precise incremental changes in the angle of inclination from one hole to the next hole.

Figure 9:
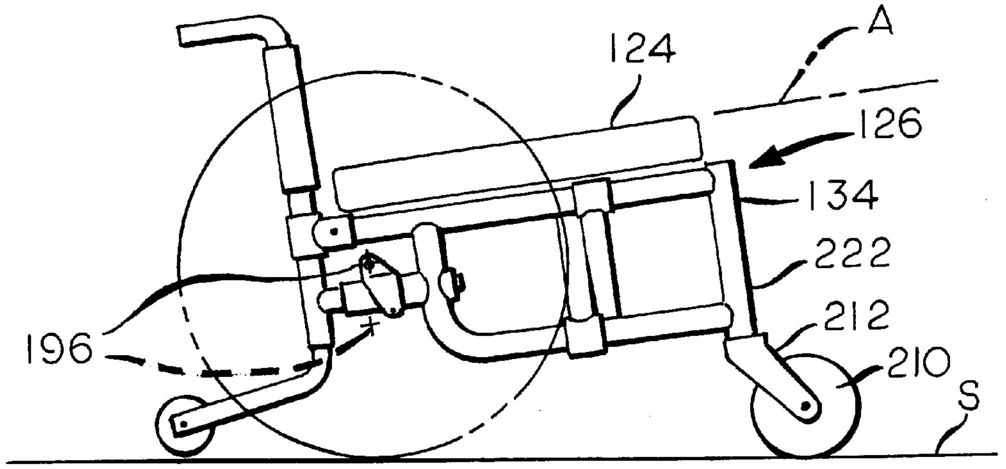
FIG. 9 is a schematic representation in elevation of the wheelchair shown in FIGS. 1 through 3, and further illustrating the inclination of the wheelchair seat being adjustable by adjusting the elevation of the rear wheel axle.

As illustrated in FIG. 9, the elevation of the seat 124 may be further adjusted by adjusting the point at which the rear wheel axle 196 is fixed relative to the rear side frame 128. By decreasing the elevation of the rear wheel axle 196 relative to the rear side frame 128, the seat 124 tilts forward (not shown). By increasing the elevation of the rear wheel axle 196 relative to the rear side frame 128, the seat 124 tilts rearward. The elevation of the rear wheel axle 196 may be adjusted in any suitable manner.

The height of the front member 134 of each front side frame 126 may be adjusted by varying the physical dimensions of the caster forks 212 and the casters 210; that is, by varying the length of the caster forks 212 and the radius or diameter of the casters 210. Varying the height of the front member 134 of each front side frame 126 varies the height of the front of the wheelchair frame 112, and hence, varies the height of the front of the seat 124.

Figure 10:
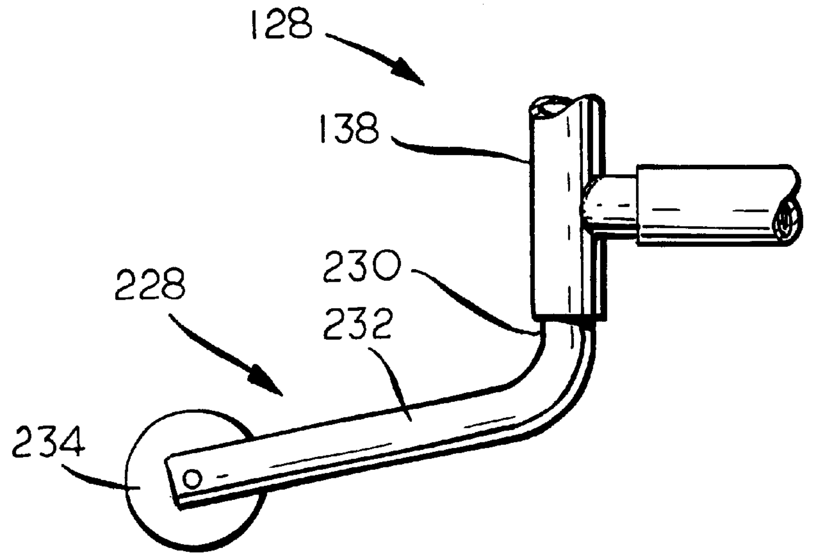
FIG. 10 is an enlarged partial side elevational view of the rear side frame supporting an anti-tip wheel assembly.

An additional benefit provided by the rear side frame 128 described above lies in the ability of the rear side frame 128 vertical member 138 to receive and support an upper vertically disposed tube 230 of an anti-tip wheel assembly 228. The anti-tip wheel assembly 228 shown in the drawings, and particularly, in FIG. 10, includes, in addition to the upper vertically disposed tube 230, a lower angularly disposed tube 232. The upper tube 230 is slidably insertable into a lower portion of the rear member 138 of the rear side frame 128. The lower tube 232 has a lower end which may be adapted to support an anti-tip wheel 234. The anti-tip wheels 234 is provided to limit the rearward tilt or tip of the wheelchair 110 to reduce the risk of the wheelchair tipping rearwardly over. A certain amount of tip may be permitted by adjusting the elevation of the anti-tip wheels 234 relative to the supporting surface. Adjusting the elevation of the anti-tip wheels 234 is accomplished by slidably displacing the anti-tip wheels 234 within the lower portion of the vertical member and fixing the the anti-tip wheels 234 in a desired position relative to the vertical member 136.

It should be understood that the terms "upper," "lower," "front," "rear," "vertical," and "horizontal" used throughout this description are all orientations defined with respect to the wheelchair 110 shown in FIG. 1, and having its orientation described in the "Brief Description of the Drawings." Moreover, the terms "vertical" and "horizontal" used throughout this description should be understood to mean "substantially vertical" and "substantially horizontal." Although elements of the invention are shown disposed horizontally and vertically, and arranged parallel and perpendicular relative to other elements, it should be understood that other orientations can be used with the invention.

It should further be understood that the term "tube" here defines an elongated, substantially hollow body. Although a cylindrically shaped tube is preferable, other shaped tubes may be employed.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A wheelchair side frame comprising:

a front side frame including a rear member and a rear extension extending rearward relative to said rear member; and a rear side frame coupled to said front side frame, said rear side frame including a rear member and a front member extending forwardly from said rear member, said rear member of said rear side frame and said rear extension of said front side frame being coupled together, said rear extension of said front side frame being adjustable in elevation relative to said rear member of said rear side frame, said front member of said rear side frame being coupled to said rear member of said front side frame and being adjustable in elevation relative to said rear member of said front side frame.

2. A wheelchair side frame according to claim 1, further including:

a first coupling, said rear member of said rear side frame being coupled to said rear extension of front side frame by said first coupling; and a second coupling, said front member of said rear side frame being coupled to said rear member of said front side frame by said second coupling, said first coupling and said second coupling each being adjustable in a substantially vertical direction.

3. A wheelchair side frame comprising:

a front side frame including a rear member and a rear extension extending rearwardly relative to said rear member;

a rear side frame coupled to said front side frame, said rear side frame being adjustable relative to said front side frame to vary the elevation of said rear side frame relative to said front side frame, said rear side frame including a substantially vertical member and a substantially horizontal member extending forwardly from said substantially vertical member; and said rear extension, said rear member, said substantially vertical member, and said substantially horizontal member each being tubular in construction.

4. A wheelchair side frame according to claim 3, further including:

a first coupling comprising a first tube clamp and a second tube clamp extending substantially perpendicularly from said first tube clamp, said first tube clamp being engageable with said substantially vertical member of said rear side frame and said second tube clamp being engageable with said rear extension of said front side frame to couple said rear extension and said substantially vertical member together, and a second coupling comprising:

a saddle surface supported by said substantially horizontal member of said rear side frame;

a hole passing through said rear member of said front side frame; and a bolt, said rear member of said front side frame being positionable against said saddle surface, said bolt being insertable into and through said hole in said rear member of said front side frame and further being threadably engageable with said substantially horizontal member of said rear side frame to clamp said rear member of said front side frame against said saddle surface.

5. A wheelchair side frame comprising:

a front side frame having an upper portion and a lower portion, and a rear side frame having an upper portion and a lower portion;

a first coupling, said upper portion of said rear side frame being coupled to said upper portion of said front side frame by said first coupling; and a second coupling, said lower portion of said rear side frame being coupled to said lower portion of said front side frame by said second coupling, said first coupling and said second coupling being adjustable in elevation.

6. A wheelchair side frame according to claim 5, wherein said front side frame includes a rear member and a rear extension extending rearwardly relative to said rear member; and said rear side frame includes a substantially vertical member and a substantially horizontal member extending forwardly relative to said substantially vertical member, said substantially vertical member of said rear side frame and said rear extension of said front side frame being coupled together, and said substantially horizontal member of said rear side frame and said rear member of said front side frame being coupled together.

7. A wheelchair side frame according to claim 6, wherein said first coupling comprises a first clamp and a second clamp extending forwardly from said first clamp, said first clamp being engageable with said substantially vertical member and said second clamp being engageable with said rear extension to couple said substantially vertical member and said rear extension together; and a second coupling, said substantially horizontal member of said rear side frame and said rear member of said front side frame being coupled together by said second coupling.

8. A wheelchair side frame according to claim 7, wherein said rear member, said rear extension, said substantially vertical member, and said substantially horizontal member are each tubular in construction; and said first and second clamps of said first coupling are tube clamps.

9. A wheelchair side frame according to claim 7, wherein said rear member, said rear extension, said substantially vertical member, and said substantially horizontal member are each tubular in construction;

said first and second clamps of said first coupling are tube clamps; and and said second coupling includes:

a saddle surface supported by said substantially horizontal member of said rear side frame;

a hole passing through said rear member of said front side frame;

a saddle washer; and a bolt, said rear member of said front side frame being positionable between said saddle surface and said saddle washer, said bolt being insertable into and through said saddle washer and said hole in said rear member of said front side frame and further being threadably engageable relative to said substantially horizontal member of said rear side frame to clamp said rear member of said front side frame between said saddle surface and said saddle washer.

10. A wheelchair side frame for a wheelchair having a seat having a front portion and a rear portion, said side frame comprising:

a front side frame having a front portion and a rear portion, said front portion of said front side frame being structured and configured to support the front portion of the seat, said rear portion of said front side frame being structured and configured to support the rear portion of the seat, said front side frame further including a substantially vertical rear member and a rear extension extending reward of said rear member; and a rear side frame including a substantially vertical member and a substantially horizontal member joined to said substantially vertical member of said rear side frame, said substantially vertical member of said rear side frame being coupled to said rear extension of said front side frame by a first coupling, said substantially horizontal member of said rear side frame being coupled to said rear member of said front side frame by a second coupling.

11. A side frame for a wheelchair having a seat having a front portion and a rear portion, said side frame comprising:

a front side frame having a front portion structured and configured to support the front portion of the seat and a rear portion structured and configured to support the rear portion of the seat;

a rear side frame including a substantially vertical member and a substantially horizontal member joined to said substantially vertical member of said rear side frame;

a first coupling coupling said substantially vertical member of said rear side frame being coupled to a rear extension of said front side frame, said first coupling comprises a first clamp and a second clamp extending substantially forwardly from said first clamp, said first clamp being engageable with said substantially vertical member of said rear side frame and said second clamp being engageable with said rear extension of said front side frame to couple said substantially vertical member of said rear side frame to said rear extension of said front side frame; and a second coupling coupling said substantially horizontal member of said rear side frame to said rear member of said front side frame.

12. A wheelchair side frame according to claim 11, wherein said rear extension and said rear member of said front side frame and said substantially vertical member and said substantially horizontal member of said rear side frame each being tubular in construction; and said first and second clamps of said first coupling are tube clamps.

13. A wheelchair side frame according to claim 11, wherein said rear extension and said rear member of said front side frame and said substantially vertical member and said substantially horizontal member of said rear side frame are each tubular in construction; and said first and second clamps of said first coupling are tube clamps; and and said second coupling includes:

a saddle surface supported by said substantially horizontal member of said rear side frame;

a hole passing through said rear member of said front side frame;

a saddle washer; and a bolt, said rear member of said front side frame being positionable between said saddle surface and said saddle washer, said bolt being insertable into and through said saddle washer and said hole in said rear member of said front side frame, said bolt further being threadably engageable relative to said substantially horizontal member of said rear side frame to clamp said rear member of said front side frame between said saddle surface and said saddle washer.

14. A wheelchair comprising:

a pair of spaced apart side frames, said side frames being coupled together, each said side frame comprising:

a front side frame including an upper member, a lower member, a front member, and a rear member, said upper and lower members being substantially horizontal and spaced apart, said front and rear members being substantially vertical and spaced apart, said upper and lower members further being joined together by said front and rear members, said front side frame further comprising a rear extension extending rearwardly relative to said upper member and said rear member;

a rear side frame coupled to said front side frame, said rear side frame including a substantially vertical member and a substantially horizontal member, said substantially horizontal member being joined substantially perpendicularly to said substantially vertical member, said substantially vertical member of said rear side frame being coupled to said rear extension of said front side frame, said substantially horizontal member of said rear side frame being coupled to said rear member of said front side frame, said rear side frame being adjustable in elevation relative to said front side frame; and a pair of rear wheels, each said rear side frame supporting one of said rear wheels; and a pair of front casters, each said front side frame supporting one of said casters.

15. A wheelchair according to claim 14, further including:

a foldable cross-frame spanning said side front frames, said front side frames being coupled together by said cross-frame.

16. A wheelchair according to claim 14, further including:

a first coupling comprising a first clamp and a second clamp extending substantially forwardly from said first clamp, said first clamp being engageable with said substantially vertical member and said second clamp being engageable with said upper member to couple said upper member to said substantially vertical member; and a second coupling, said substantially horizontal member of said rear side frame being coupled to said rear member of said front side frame by said second coupling.

17. A wheelchair according to claim 16, wherein said upper member, said rear member, said substantially vertical member, and said substantially horizontal member are each tubular in construction;

said first and second clamps of said first coupling are tube clamps; and and said second coupling includes:

a saddle surface supported by said substantially horizontal member of said rear side frame;

a hole passing through said rear member of said front side frame;

a saddle washer; and a bolt, said rear member of said front side frame being positionable between said saddle surface and said saddle washer, said bolt being insertable into and through said saddle washer and said hole in said rear member of said front side frame, said bolt further being threadably engageable relative to said substantially horizontal member of said rear side frame to clamp said rear member of said front side frame between said saddle surface and said saddle washer.

* * * * *